United States Patent
Bregman et al.

(10) Patent No.: US 11,003,439 B2
(45) Date of Patent: May 11, 2021

(54) INCORPORATING VERSION CONTROL INTO PACKAGING

(71) Applicant: Red Hat Israel, Ltd., Raanana (IL)

(72) Inventors: Arie Bregman, Gan Yavne (IL); David Sariel, Holon (IL)

(73) Assignee: RED HAT ISRAEL, LTD., Raanana (IL)

( * ) Notice: Subject to any disclaimer, the term of this patent is extended or adjusted under 35 U.S.C. 154(b) by 0 days.

(21) Appl. No.: 15/922,533

(22) Filed: Mar. 15, 2018

(65) Prior Publication Data
US 2019/0286438 A1 Sep. 19, 2019

(51) Int. Cl.
G06F 9/44 (2018.01)
G06F 8/71 (2018.01)
H04L 29/06 (2006.01)
H04L 29/08 (2006.01)

(52) U.S. Cl.
CPC .............. G06F 8/71 (2013.01); H04L 67/34 (2013.01); H04L 67/40 (2013.01)

(58) Field of Classification Search
CPC ............ G06F 8/71; H04L 67/34; H04L 67/40
USPC .................................................. 717/120–123
See application file for complete search history.

(56) References Cited

U.S. PATENT DOCUMENTS 5,920,867 A * 7/1999 Van Huben ......... G06F 16/1873
8,327,351 B2 * 12/2012 Paladino ................... G06F 8/71
717/106
8,863,114 B2 * 10/2014 Shah ......................... G06F 8/60
717/175
9,130,801 B1 * 9/2015 Carruth ............ H04L 29/08072
2014/0081679 A1 3/2014 Volkmer et al.
2015/0100945 A1 4/2015 Nadar et al.
2015/0363195 A1 * 12/2015 Schlueter .................. G06F 8/71
717/121
2016/0259795 A1 9/2016 Brandys et al.

FOREIGN PATENT DOCUMENTS

CN 102855131 A 1/2013
CN 103606068 A 2/2014

OTHER PUBLICATIONS

Michael Descy, "Plaintext Productivity—Notes and Drafts", 2015, retrieved from http://plaintext-productivity.net/2-00-notes-and-drafts-introduction.html, 40 pages (Year: 2015).*

(Continued)

Primary Examiner — Ted T. Vo
(74) Attorney, Agent, or Firm — Haynes and Boone, LLP (57) ABSTRACT

Methods, systems, and computer program products are included for incorporating functionalities of a version control system into a package manager. An example method includes providing to a package manager a source file path corresponding to a source. A software version control system corresponding to the source is determined from the source file path. A command translation driver corresponding to the software version control system of the source is loaded by the package manager. The loaded command translation driver translates a package manager command to a corresponding command of the software version control system. The translated package manager command is executed by the package manager.

20 Claims, 5 Drawing Sheets

(56) References Cited

OTHER PUBLICATIONS

Git, "2.5 Git Basics—Working with Remotes", 2015, retrieved from https://git-scm.com/book/en/v2/Git-Basics-Working-with-Remotes, 4 pages (Year: 2015).*
Watts, "ID 520—Software Release Tools on NT", 1998, CHEP'98, Chicago, 2 pages. (Year: 1998).*
Rocha et al., "Continuous Integration and Version Control: A Systematic Review", Journal of Latex Class Files, vol. 6, No. 1, 5 pgs. (Jan. 2007).
Sandobalin et al., "End-to-End Automation in Cloud Infrastructure Provisioning", ResearchGate, 26th International Conference on Information Systems Development (ISD2017 Cyprus), 13 pgs. (Sep. 5, 2017).

* cited by examiner

Command Mapping Table
414PCM

| Package Manager Command 416 | Corresponding Command of VCS A 418A | Corresponding Command of VCS B 418B | Corresponding Command of VCS C 418C |
|---|---|---|---|
| init | clone | checkout | get |
| verify | log | getlog | stats |
| build | commit | commit | commit |
| . | . | . | . |
| . | . | . | . |
| . | . | . | . |

Ad-Hoc Translation
414AH 1. pmbranch branch1 - - VCSbrand branch branch1 file_path_branch1
2. pmbuild source1 -all -changelog - - VCSbrand commit source1 -a -m -log
3. pmbranch branch2 -changelog     .
    .
    .

INCORPORATING VERSION CONTROL INTO PACKAGING

FIELD OF DISCLOSURE

The present disclosure generally relates to software package management and version control.

BACKGROUND

A software package manager organizes software files and resources into a software package. A user may specify the files and resources (also known as sources) to be included in the software package using an interface. In some examples, a specification or configuration file may be used to specify the sources to be built into a package.

Software version control systems mark software packages, files, and resources with a version number to distinguish between older and newer versions of the software. For example, as further development occurs with respect to the software, new software versions are released that include additional features and/or correct earlier defects in the software. These new software versions generally include updated version numbers to distinguish from the previous software versions.

Software versioning techniques generally include incrementing the version number as newer versions are released. Versions can also be categorized as major versions and minor versions. For example, in a version x.y, the x portion can indicate the major version corresponding to the software and the y portion can indicate the minor version corresponding to the software. Accordingly, by reviewing the version numbers, users generally are able to identify the latest version of the software.

SUMMARY

A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: providing, to a package manager, a source file path corresponding to a source. The method also includes determining, from the source file path, a software version control system corresponding to the source. The method also includes loading, by the package manager, a command translation driver corresponding to the software version control system of the source. The method also includes translating, by the loaded command translation driver, a package manager command to a corresponding command of the software version control system; and executing, by the package manager, the translated package manager command. Other examples of this aspect include corresponding computer systems, apparatus, and computer programs recorded on one or more computer storage devices, each configured to perform the actions of the methods.

One general aspect includes a non-transitory machine-readable medium having stored thereon machine-readable instructions executable to cause at least one machine to perform operations including: providing, to a package manager, a source file path corresponding to a source. The non-transitory machine-readable medium also includes determining, from the source file path, a software version control system corresponding to the source. The non-transitory machine-readable medium also includes loading, by the package manager, a command translation driver corresponding to the software version control system of the source. The non-transitory machine-readable medium also includes translating, by the loaded command translation driver, a package manager command to a corresponding command of the software version control system; and executing, by the package manager, the translated package manager command. Other examples of this aspect include corresponding computer systems, apparatus, and computer programs recorded on one or more computer storage devices, each configured to perform the actions of the methods.

One general aspect includes a system. The system includes a non-transitory memory including instructions and one or more hardware processors coupled to the non-transitory memory to execute instructions from the non-transitory memory to perform operations. The operations comprise: providing, to a package manager, a source file path corresponding to a source; determining, from the source file path, a software version control system corresponding to the source; loading, by the package manager, a command translation driver corresponding to the software version control system of the source; translating, by the loaded command translation driver, a package manager command to a corresponding command of the software version control system; and executing, by the package manager, the translated package manager command. Other examples of this aspect include corresponding computer systems, apparatus, and computer programs recorded on one or more computer storage devices, each configured to perform the actions of the methods.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Various examples described herein provide techniques for measuring similarity of software components, such as packages, files and other resources. These techniques evaluate intrinsic properties of the software components, providing useful advantages over the traditional techniques of software versioning. These techniques solve problems associated with traditional software versioning techniques, as described below.

Conventional software package managers, including those developed in the 1990s, do not offer the sophisticated versioning techniques of later developed version control systems. For example, software package managers may still require a user to manually enter in a change log a description of changes between versions. Thus, the quality and quantity of version control information available to subsequent users depends on the inputting user. Where a large number of changes are made between versions, maintaining a detailed and informative change log may simply become too tedious for a user.

Yet, version control systems may, for example, be programmed to analyze changes between versions and automatically generate a detailed change log. Contemporary version control systems may also include other functionalities, such as the ability to develop multiple branches off of a particular version. Rather than replicating the functionalities of version control systems in a package manager, it may be more efficient, and thus more desirable, to instead bootstrap the functionalities of a version control system into a package manager. A further benefit of bootstrapping is that users who are already familiar with the commands and user interface of the package manager would not need to learn another interface, i.e., that of the version control system.

The techniques described herein provide solutions to the version control limitations of traditional package managers. That is, these techniques described herein provide a way to bootstrap the functionalities of a version control system to a package manager. Further, these techniques allow for user modification and customization, support machine learning, and are performed in an efficient manner to conserve system resources.

In more detail, the bootstrapping takes into account the different types of sources used to build the package. Such sources may include individual files, tarballs, packages, repositories, etc., and these may be stored in databases or repositories corresponding to various version control systems. The package manager determines from the sources' file paths the applicable version control systems and loads a corresponding command translation software or driver. When the package manager receives a command, for example to compare two sources and generate a change log, the package manager may parse the command to determine if the command is a command of the package manager or the applicable version control system. In some examples, the package manager consults a pre-programmed mapping of commands. In some examples, the package manager consults a current listing of available commands of the applicable version control system from a local or remote source.

In some examples, the command is determined to be a command of a version control system. The package manager translates the command to a corresponding command of the applicable version control system, and executes the translated command. In some examples, the translation and the execution may be transparent to the user, i.e., the user is not aware or made aware that a translation has occurred, as for example, the specific mapping used and the translation details are not displayed to the user in the package manager user interface. However, a user may be able to view such details if desired, for example by including a flag or an option when entering the command.

In some examples, the command translation driver may support user modification, user customization, and machine learning. For example, a user may augment the "vocabulary" of the command translation driver by defining new commands or associating existing commands with commands of a version control system. A user may, for example, input a package manager command in its usual syntax, followed by a delimiter, and followed by the desired version control system command. If the command is successful, the command translation driver may add the association to its "vocabulary," and store the command. The package manager may also update its own "vocabulary" by crawling local or remote sources, such as websites of version control systems, for new commands or variations, extensions, options, etc., of existing commands. In some examples, the package manager may recommend commands based on historical input or predictive algorithms.

Thus, these techniques not only improve the functioning of computing systems and package managers, but also does so in an efficient, dynamic way that supports user customization and machine learning. Users benefit from being able to use the latest features of a software version control system from the comfort of a familiar user interface—that of the package manager.

Figure 1:
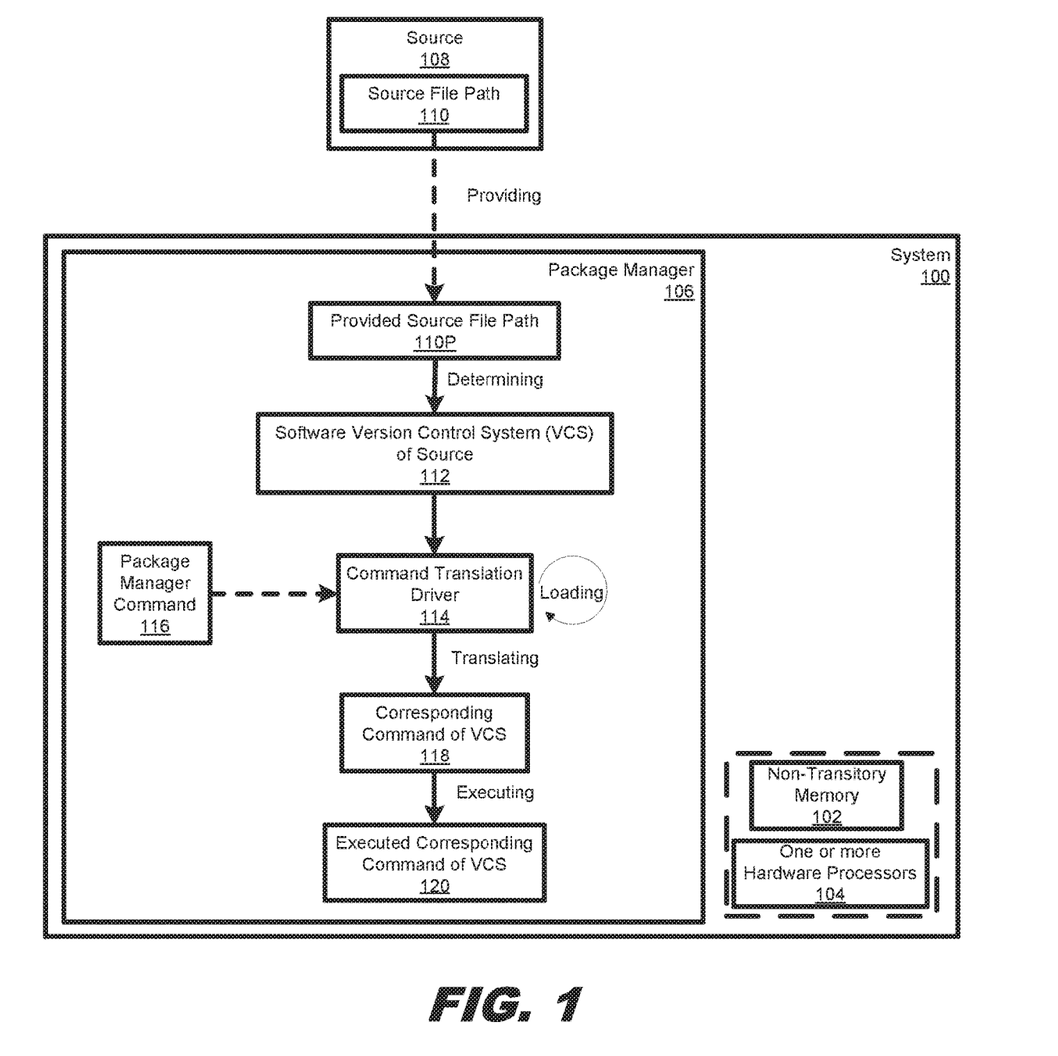
FIG. 1 is an organizational diagram illustrating a system for incorporating functionalities of a version control system into a package manager, in accordance with various examples of the present disclosure.

FIG. 1 is an organizational diagram illustrating a system 100 for incorporating functionalities of a version control system into a package manager, in accordance with various examples of the present disclosure.

The system 100 includes a non-transitory memory 102 and one or more hardware processors 104. The non-transitory memory 102 may be structured to include at least one computer-readable storage medium on which is stored one or more sets of instructions (e.g., software) including any one or more of the methodologies or functions described herein. The non-transitory memory 102 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory machine-readable medium that are executable by the processor.

The one or more hardware processors 104 may be structured to include one or more general-purpose processing devices such as a microprocessor, central processing unit (CPU), and the like. More particularly, the processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor is structured to include one or more special-purpose processing devices such as an application specific integrated circuit (ASIC), a field programmable gate array (FPGA), a digital signal processor (DSP), network processor, and so forth. The processor executes instructions for performing the operations, steps, and actions discussed herein.

In some examples, the system 100 includes a bus or other communication mechanism for communicating information data, signals, and information between the non-transitory memory 102, the one or more hardware processors 104, and the various components of system 100. For example, the various components may include a data storage device, which may be local to the system 100 or be communicatively coupled to the system 100 via a network interface. Components may further include input/output (I/O) components such as a keyboard, mouse, touch interface, and/or a camera that process user actions such as key presses, clicks, taps, gestures, etc., and which send a corresponding signal to the bus or other communication mechanism. The I/O components may also include an output component such as a display.

In some examples, a user may use the I/O component to command the system 100, via a user interface such as a graphical user interface, a command line interface, or any other user interface, to enter a package manager command 116 to a package manager 106. For example, a user may instruct the package manager 106 via package manager command 116 to build a package using a source. In some examples, the source may be locally located on a storage device of the system 100. In some examples, the source may be remotely located, for example, on a remote server communicably coupled to the system 100 via a network. Generally, a transceiver or network interface transmits and receives signals between electronic devices via a communications link to a network. The network may be a local area network (LAN), wireless LAN (WLAN), public switched telephony network (PTSN), and/or various other wired or wireless networks, including telecommunications, mobile, and cellular phone networks, the internet, a cloud, a peer-to-peer sharing network, and/or any combination of networks thereof that is capable of interconnecting computing devices and/or computer programs. In some examples, the transmission is wireless, although other transmission media and methods may also be suitable.

The source 108 may be a local source or a remote source, and the source may be located at, or accessed via, a corresponding source file path 110. In some examples, the system 100 includes the source 108 if the source is a local source. In some examples, the system 100 does not include the source 108 if the source is a remote source. In some examples where multiple local and remote sources are used, the system 100 may include the local sources and exclude the remote sources.

The source 108 may include a corresponding source file path 110. The source file path 110 may be a local source file path or a remote source file path, and the source file path 110 may be provided to a package manager 106.

In some examples, the package manager 106 may determine from the provided source file path 110P the corresponding software version control system (VCS) 112 of the source 108. For example, if the source 108 were a repository of a version control system remotely hosted on the internet, the source file path 110 may be "www.VCSbrandXhub.com." The source file path 110 may be provided to the package manager 106. Based on the provided source file path 110P, in particular "VCSbrandXhub," the package manager 106 may determine that the source 108R is a "VCSbrandX" type source. Other ways to determine the VCS 112 corresponding to the source 108 may be by source description, source metadata, source file extensions, source packaging format, source object and file path structure, etc.

In some examples, the package manager 106 loads a command translation driver 114. The command translation driver 114 may be loaded based on whether a command translation is required. Alternatively, the command translation driver 114 may always be loaded regardless of whether a command translation is required, for example, upon initiation of the package manager 106.

A user may provide a package manager command 116 to the package manager 106 at any time. For example, a package manager command 116 may be provided to instruct the package manager 106 to retrieve the source 108. Based on the form, format, syntax, content, delimiters, options or other information associated with the package manager command 116, the package manager 106 may determine that the package manager command 116 is a VCS command. For example, the package manager command 116 may not be defined in the command list of package manager 106, or may include options not defined in the command list of package manager 106. For example, the package manager command 116 may be "pmbuild -optionX - -VCSbrandX commit -a -m." If "-optionX" is not a valid option in the command list of the package manager 106, the package manager 106 may determine that a translation may be required. Accordingly, the command translation driver 114 may be loaded, and the package manager command 116 may be provided to the command translation driver 114.

Referring to the same example package manager command 116, i.e., "pmbuild -optionX - - VCSbrandX repohub commit -a -m," notice that the command includes a delimiter "- -." The package manager 106 may determine from the delimiter and the following portion of the command, i.e., "- - VCSbrandX," that the package manager command 116 is a "VCSbrandX" command and not a package manager command 116 native to the package manager 106.

A command translation driver 114 may translate the package manager command 116 to a corresponding command 118 of the VCS 112. In some examples, one or more of the system 100, the package manager 106, or the command translation driver 114 may consult or look up a package manager command 116 in a command map or a command table to find the corresponding command 118 of the VCS 112. In some examples, the package manager 106 may perform an ad-hoc translation. In some examples, the ad-hoc translation is provided as part of the package manager command 116, such as by the use of delimiters. In some examples, the ad-hoc translation is performed by searching locally, such as on a local file system, or remotely, such as on the internet, to determine the corresponding command 118 of the VCS 112. The search may be performed by one or more of the system 100, the package manager 106, or the command translation driver 114. In some examples, a remote website of the applicable VCS 112 is searched. In some examples, an internet search engine is used to perform the search. Further, in ad-hoc translations, the package manager 106 may present a user with several translation options to ensure the most accurate translation. In some examples, the translation options are ranked in order of confidence, closest matched phrases, accuracy, keyword hits, etc. In some examples, the highest ranked translation option is selected by default. In some examples, the package manager 106 may learn the correct translation directly, e.g., through user feedback or user selection, or indirectly, e.g., through single or repeated user acquiescence. Thus, policies may be put in place to determine the translation sensitivity and behavior of the package manager 106.

The package manager 106 may execute the package manager command 116. In some examples, such as those requiring a translation, the package manager 106 may execute the corresponding command 118 of VCS 112 based on the translation provided by the command translation driver 114. In some examples, such as those not requiring a translation, the package manager 106 may execute the package manager command 116. The executed command 120 of VCS 112 may perform any of the functionalities supplied by VCS 112.

Figure 2:
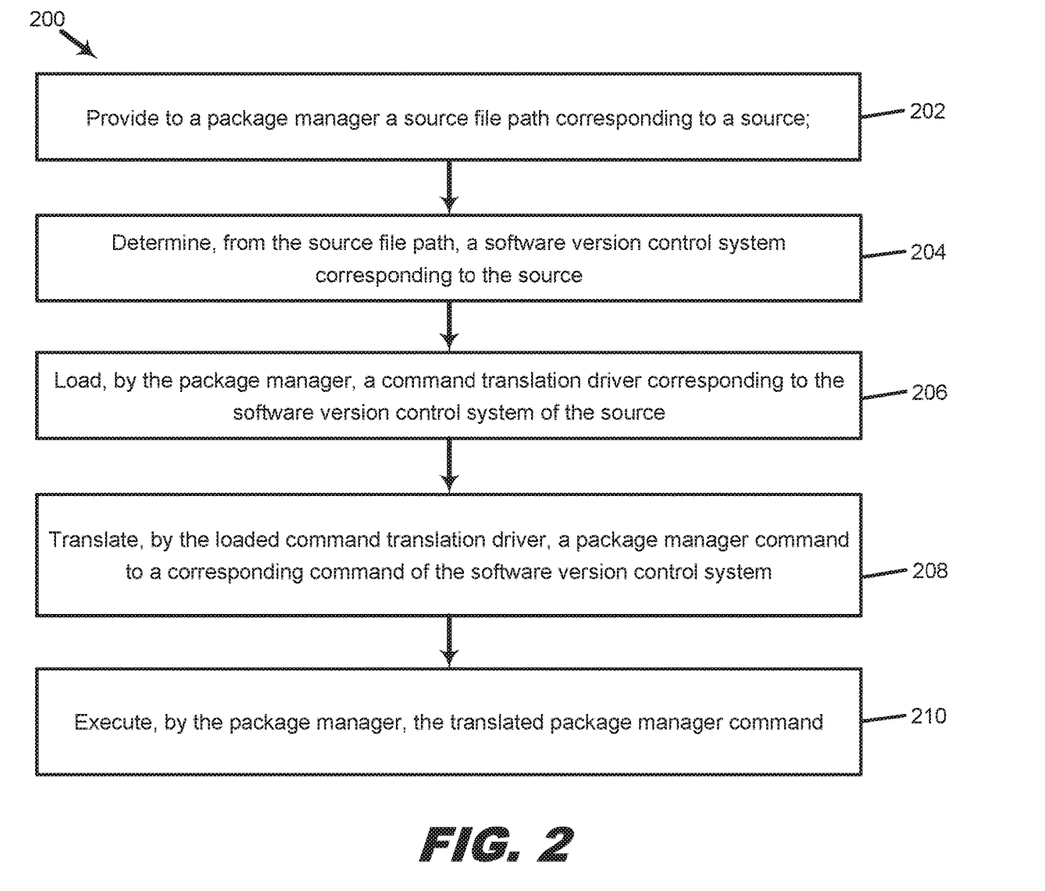
FIG. 2 is a flow diagram illustrating a method for incorporating functionalities of a version control system into a package manager, in accordance with various examples of the present disclosure.

FIG. 2 is a flow diagram of a method 200 for incorporating functionalities of a version control system into a package manager, in accordance with various examples of the present disclosure. In some examples, the method is performed by executing computer-readable instructions that are stored in a non-transitory memory using one or more processors. The non-transitory memory and processors may be provided by, for example, the hardware described with respect to FIG. 1. The method 200 may be performed by the one or more hardware processors 104 that is described in further detail with respect to FIG. 1. Additional steps may be provided before, during, and after the steps of method 200, and some of the steps described may be replaced, eliminated and/or re-ordered for other examples of the method 200. For example, prior to the steps of method 200, a user may manually select a source repository and pull the source repository from a remote repository hosting service such as "www.repohub.com" to a local storage device on system 100. Method 200 may also include additional steps, such as looking up a data structure to determine if a package manager command is defined in a command list of the package manager. Method 200 may also include a step of building a package using the provided source file. Method 200 may also be performed, for example, in combination with the steps of method 500 described with respect to FIG. 5. Method 200 may also be performed using a package manager command 316R to retrieve data from one or more remote sources and other elements described with respect to FIG. 3. Method 200 may also be performed using a command translation driver 414PCM with pre-configured mapping, or a command translation driver 414AH with ad-hoc translation, both of which are described with respect to FIG. 4. In some examples, method 200 may be performed by one or more systems 100 described with respect to FIG. 1, acting in concert or individually.

At action 202, a source file path corresponding to a source is provided to the package manager. The source file path may be manually provided by a user within an interface of the package manager, or the source file path may be provided as part of a "specification" or configuration file which includes a list of sources to be built into a package. The specification or configuration file may be a text file containing text and include lines of code to indicate the desired sources. A user may enter a package manager command to command the package manager to access the configuration file and read the included sources.

At action 204, a software version control system (VCS) corresponding to the source is determined from the source file path. For example, if the source file path were a remote source file path, such as "www.VCSbrandhub.com," the corresponding VCS may be determined to be "VCSbrand."

In some examples, the source file path may be a local source file path which may also include a phrase, such as "VCSbrand," which matches or corresponds to a trade name of a VCS. Thus, it may be determined that the corresponding VCS is "VCSbrand." In some examples, determining the corresponding VCS from the source file path also includes back-up methods of determining the corresponding VCS by other means, which may, for example, be triggered when the system is unable to determine the VCS from the source file path. Other ways of determining the corresponding VCS may include analyzing package manager commands executing or to be executed on the source or a local copy or clone of the source. In some examples, the package manager commands may include delimiters followed by a VCS specific command in the required syntax of the VCS, such as "pmbuild -option!- -VCSbrand commit -a - m." In this example, the delimiter "- -" is used to denote that a non-packaged manager command, i.e., a VCSbrand command, is to be executed. As exemplified, the corresponding VCS may be determined to be VCSbrand from the package manager command.

At action 206, a command translation driver corresponding to the VCS is loaded. In some examples, the command translation driver is loaded by the package manage, and the loading may include a request by the package manager for the system 100 to load the command translation driver. For example, if at action 204 the corresponding VCS were determined to be VCSbrand, then the VCSbrand translation driver may be loaded. In some examples, the loading includes instances when the driver may already be loaded, such as during the initiation of the package manager, or such as when the driver was already loaded in a previous use. In such instances, the loading may include verifying that the correct driver has been loaded. While the phrase "driver" has been used to describe the software which performs the command translation, the phrase is intended to generally refer to any form of software programmed to perform the command translation.

At action 208, a package manager command is translated by the loaded command translation driver to a corresponding command of the VCS. For example, the package manager command "pmbuild -changelog" may not exist in the command list of the package manager, as may be determined in the preceding actions of method 200 or as described with respect to FIG. 1. However, as also earlier described with respect to FIG. 1, the command may be defined in a command translation map of the loaded command translation driver. While the package manager command "pmbuild -changelog" may not include any specific references to a particular VCS, recall that the applicable VCS had earlier been determined at action 204, and that the applicable command translation driver for that VCS had been loaded at action 206. For example, the applicable VCS may be "VCSbrand." Thus, while "pmbuild -changelog" may generically be mapped to "-commit -m" in a default or non-VCS specific map, by having determined the applicable VCS and by having loaded the correct driver for that VCS, the package manager may specifically map "pmbuild -changelog" to, for example, "VCSbrand -commit -a -m."

At action 210, the translated package manager command is executed. For example, the executed translated package manager command may be "VCSbrand -commit -a -m." The package manager may transparently execute the translated package manager command by acting as a user or a client of the VCS (which is assumed has been downloaded and installed on the system). For example, the package manager may first initialize a local repository of the VCS, which may create an empty repository formatted with a data structure, headers, tags, references, templates, etc., of the VCS. The empty repository may be filled using a copy or clone of the source, by for example, the package manager executing a corresponding VCS command such as "VCS brand cp source_name source_file_path" or "VCSbrand clone source_name source_file_path." In some examples, once the local repository has been initialized and cloned, the package manager may execute the translated package manager command (or indeed any VCS command) on the local repository.

For instance, using method 200, it may be possible to determine detailed version changes between two local packages by first building, using the translated build command of the VCS, the local packages into "VCSbrand" repositories, then committing the packages using the translated commit command of the VCS, and running a VCSbrand command such as "-log" to obtain the detailed version changes. Thus, a VCS may be used to provide a change log function (among a whole host of other functions not presently supported by conventional package managers), which greatly improves the functioning of conventional package managers. In particular, by bootstrapping the VCS' change log function, a package manager user may no longer need to manually describe changes in a "specification" or configuration file, and may instead rely on the detailed change log generated by a VCS.

Figure 3:
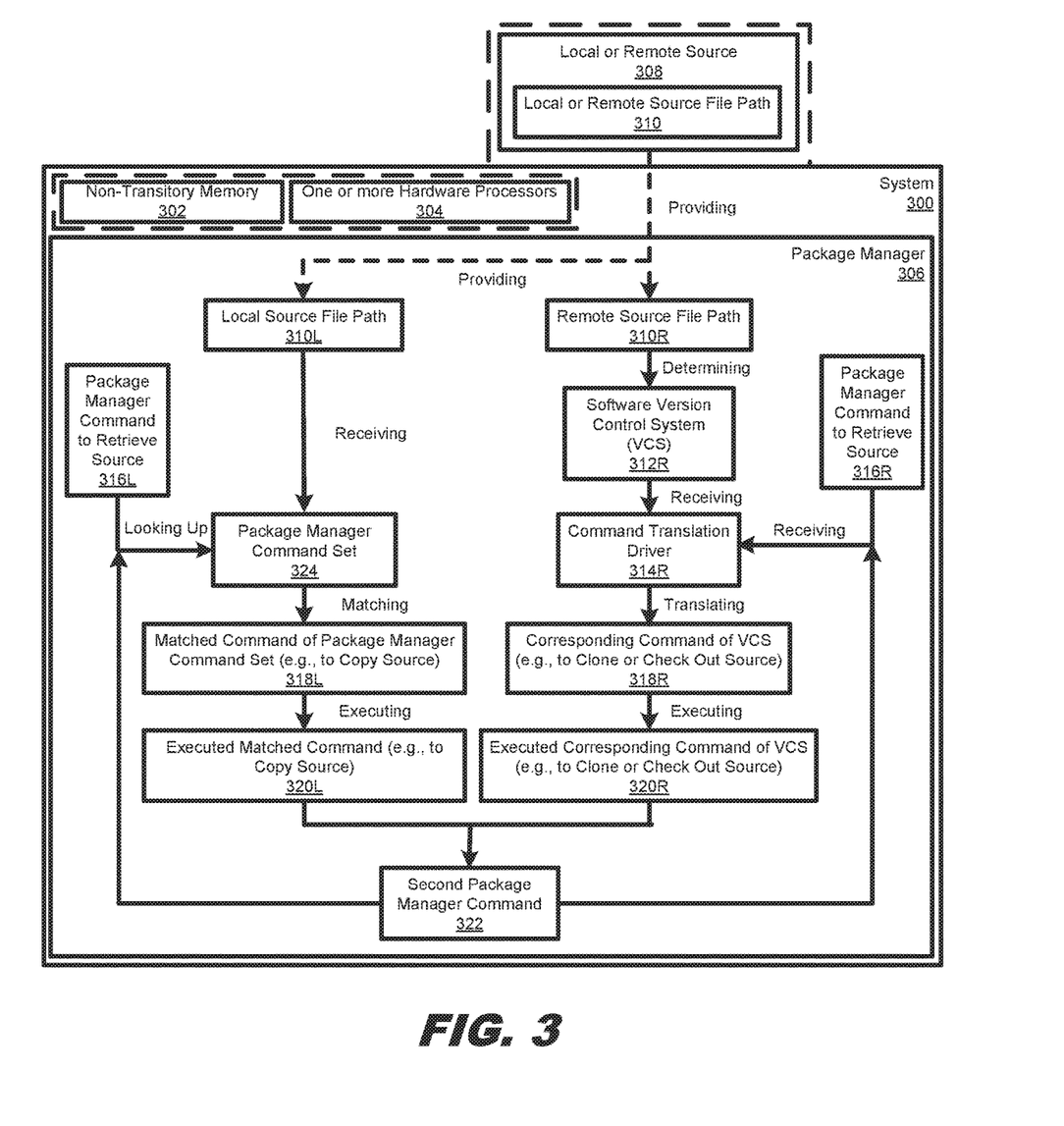
FIG. 3 is an organizational diagram illustrating a system for incorporating functionalities of a version control system into a package manager, including local and remote source file paths, in accordance with various examples of the present disclosure.

FIG. 3 is an organizational diagram of a system 300 for incorporating functionalities of a version control system into a package manager, in accordance with various examples of the present disclosure.

The system 300 may include a non-transitory memory 302 and one or more hardware processors 304 similar to those described with respect to FIG. 1. Like in system 100, the one or more hardware processors 304 may execute instructions stored in non-transitory memory 302 for performing the operations, steps, and actions discussed herein. System 300 may also include the same I/O interfaces, network interfaces, etc., as system 100.

The system 300 may also include a package manager 306 similar to FIG. 1, however package manager 306 may include more features than package manager 106. Package manager 306 may include, for example, a package manager command set 324. The package manager command set 324 may include a set or a list of package manager commands which are native to the package manager, i.e., executable by the package manager without translation to a VCS command. Package manager 306 may also determine if a command translation driver 314R is required to translate a package manager command, and if so required, responsively loading the command translation driver 314R.

The system 300 may include a local or remote source 308. In some examples, the system 300 only includes local sources such as sources stored on a local storage device. In some examples, remote sources are not part of system 300. Thus, in some examples including both local and remote sources, the local sources may be part of system 300, but the remote sources may not be. The local or remote source 308 may include a local or remote source file path 310.

The local or remote source file path may be provided to the package manager, and system 300 may perform different actions depending on whether the source file path is a local source file path, 310L, or a remote source file path, 310R. For example, for the initialization of a local source file path 310L, the package manager may process package manager commands using package manager command set 324. In some examples, the local source file path 310L points to an already initialized local repository of the applicable VCS corresponding to the local source file path 310L. For example, the local source file path 310L may include the phrase "\VCSbrand\localproject" in a file path of a local storage device. Suppose a user wishes to "retrieve" or make available on the system 300 the "localproject" source repository. Since "localproject" already exists in an initialized form on the system 300, the package manager may use a basic copy command from its package manager command set, rather than a "clone" command from the VCSbrand command set, to "retrieve" the "localproject" source repository. One advantage of such a technique is system resource conservation, since it would not be necessary to load a command translation driver to execute commands in the package manager command set 324.

In some examples, the package manager receives a command 316L. In some examples, the command may be to retrieve a local source. Retrieving a source may include installing, copying, cloning some or all of the data structure, metadata, file contents, and other data corresponding to a source. The package manager determines if the received command is defined in a package manager command set 324. The package manager may make such a determination by, for example, looking up the received command in a data structure of the package manager command set 324. The looking up may include a matching process based on user-definable matching criteria. For example, some matching criteria may require an exact command match, while other matching criteria may require an approximate match. If a match is found, the matched command 318L of the package manager command set 324 may be executed. The executed matched command 320L may be, for example, a command to copy a source repository from one initialized local repository file path, e.g., "\VCSbrand\localproject" to another local file path "\VCSbrand\localproject\sandbox." Thus, in this example, the executed matched command 320L would result in the copying of the "localproject" repository to the "sandbox" file path.

In some examples, a second package manager command 322 is input into, and received by the package manager. The second package manager command 322 may be another native command from the package manager command set, or it may be a non-native command requiring translation. In the latter case, the package manager 306 may determine that a command translation driver 314R may be required to translate the second package manager command 322 to a corresponding command of an applicable VCS. Like described with respect to FIG. 1, package manager 306 may determine the applicable VCS 312R from the source file path, which may be a remote source file path 310R. The command translation driver 314R, which may be included as part of or separate from package manager 306, may receive an indication of the applicable VCS 312R, from the system 300 or the package manager 306.

The command translation driver 314R may receive package manager commands. For example, the command translation driver 314R may receive a package manager command 316R to retrieve a source from a remote source file path 310R. The command translation driver 314R may also receive a second package manager command 322. In either case, and as earlier explained in this paragraph, with respect to either of these commands, the package manager 306 may determine that translation is required. The package manager 306 may, as earlier described, decipher the non-native command using a mapping, lookup, local and remote source search, user query, or any other technique. For example, the package manager 306 may simply not have the ability to use VCS repositories as sources for building packages. Then, the command "install VCS_source_name VCS_source_file path" may be translated to a corresponding command 318R of the VCS 312R, such as a "clone" or "checkout" VCS command.

The corresponding command 318R of the VCS 312R may be executed. The executed corresponding command 320R of the VCS 312R may result in the "installation" of the VCS source file, even though such an "installation" would not normally have been possible using the package manager command set 324. However, such a bootstrapped "installation"—if mapped correctly—may be entirely transparent to the user. And, as previously explained, the package manager may masquerade as a user entering the corresponding command 318R of the VCS 312R, further increasing transparency to a user of the package manager 306. The second package manager command 322, which may be any command of the VCS 312R, may be translated and executed in similar fashion.

Figure 4:
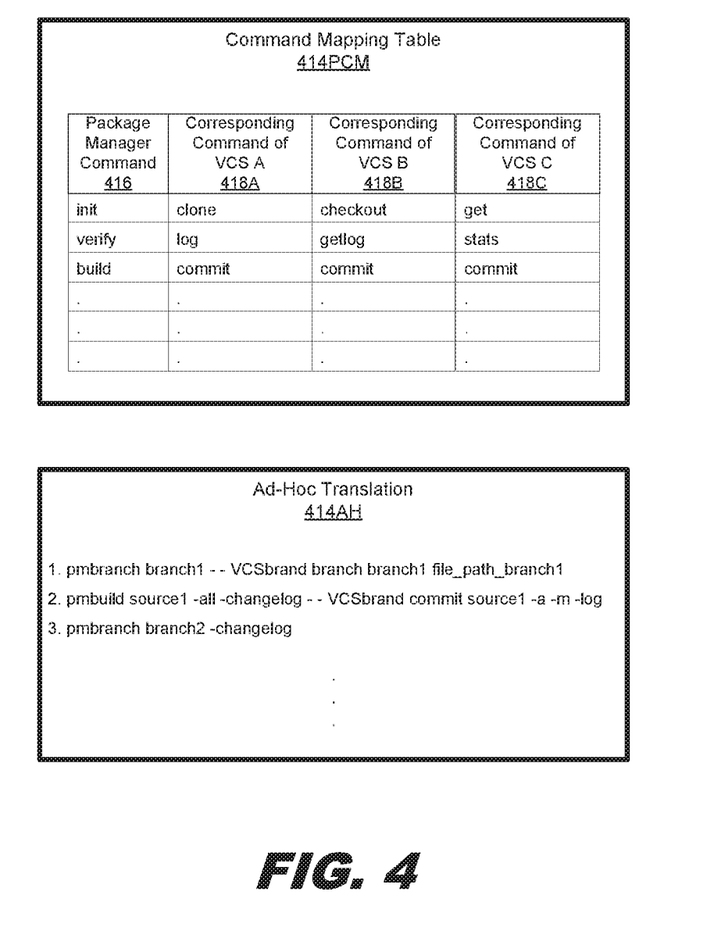
FIG. 4 is a diagrammatic representation of a command mapping table 414PCM and a sample list of ad-hoc translations 414AH, in accordance with various examples of the present disclosure.

FIG. 4 is a diagrammatic representation of a command mapping table 414PCM and a sample list of ad-hoc translations 414AH. Command mapping table 414PCM may include a column for a package manager command 416 and one or more additional columns including a corresponding command 418A, 418B, 418C, etc., of one or more VCSes respectively, i.e., VCS A, VCS B, and VCS C, etc. For example, the package manager command 416 "init" may correspond with a "clone" command of VCS A, a "checkout" command of VCS B, and a "get" command of VCS C. Thus, the corresponding command 418A, 418B, or 418C to be provided to a package manager would depend on whether the source was a VCS A, B, or C source. In some examples, the function of the package manager command 416 may not map exactly to a function provided by a corresponding command of a VCS.

For example, the "verify" package manager command 416 may provide limited version control information, however the "log" or "stats" function of VCS A and C may provide much more information. In some instances, such additional information may be desirable, and the additional functionality provided by a VCS may be the very reason why a user programmed that mapping in the first place. Yet, in some examples, the package manager command 416 may map to the same command across multiple VCSes, e.g., "build" may map to "commit" for VCSes A, B, and C.

In some examples, a user may wish to perform an ad-hoc translation 414AH. For example, the package manager may not include a "pmbranch" command in its package manager command set, and the "pmbranch" command may not be included in any of the command maps, tables, etc., used by the command translation driver. Nevertheless, as shown in example 1, a user may manually associate a package manager command with a VCS command by selecting the corresponding VCS command and entering the command in the package manager using a particular syntax and/or delimiter. For example, the non-native command "pmbranch" may be associated with or mapped to a "branch" command "VCSbrand branch" by the use of a delimiter, e.g. "- -" and a combination of suitable syntaxes. For example, the package manager command when entered in the following syntax, "pmbranch branch1 - - VCSbrand branch branch1 file_path_branch1" may instruct the package manager to use the VCS's branch command to provide "branch1" from its "branch1" repository to a specified file path, e.g., "file_path_branch1."

However, it should be noted that ad-hoc translation is not limited to non-native commands. As shown in example 2, a native command, such as "pmbuild" may be translated ad-hoc to a VCS's "commit" command. Even though the base "pmbuild" command may be native, the base command may include non-native extensions and options such as "-all" or "-changelog." These too may be mapped ad-hoc to corresponding extensions and options of the VCS's "commit" command, such as "-a," "-m," and "-log."

The package manager may remember ad-hoc translations and add ad-hoc translations to the package manager command set. For subsequent ad-hoc translations involving some or all of the ad-hoc translated command, the package manager may reuse some or all of the ad-hoc translation. In example 3, the non-native command "pmbranch" and the non-native extension—changelog are used again. The package manager may consult a record of its ad-hoc translations, and determine that "pmbranch" mapped to "VCSbrand branch" from example 1, and that "changelog" mapped to "-log" from example 2. Thus, the package manager may execute "VCSbrand branch branch2 create_file_path_branch2-log" without a user so specifying. Notice that in example 3, no delimiter and no VCS commands are specified, yet the package manager is still able to execute the user's intended command by studying prior context. The package manager is therefore a smart package manager capable of self-learning.

Figure 5:
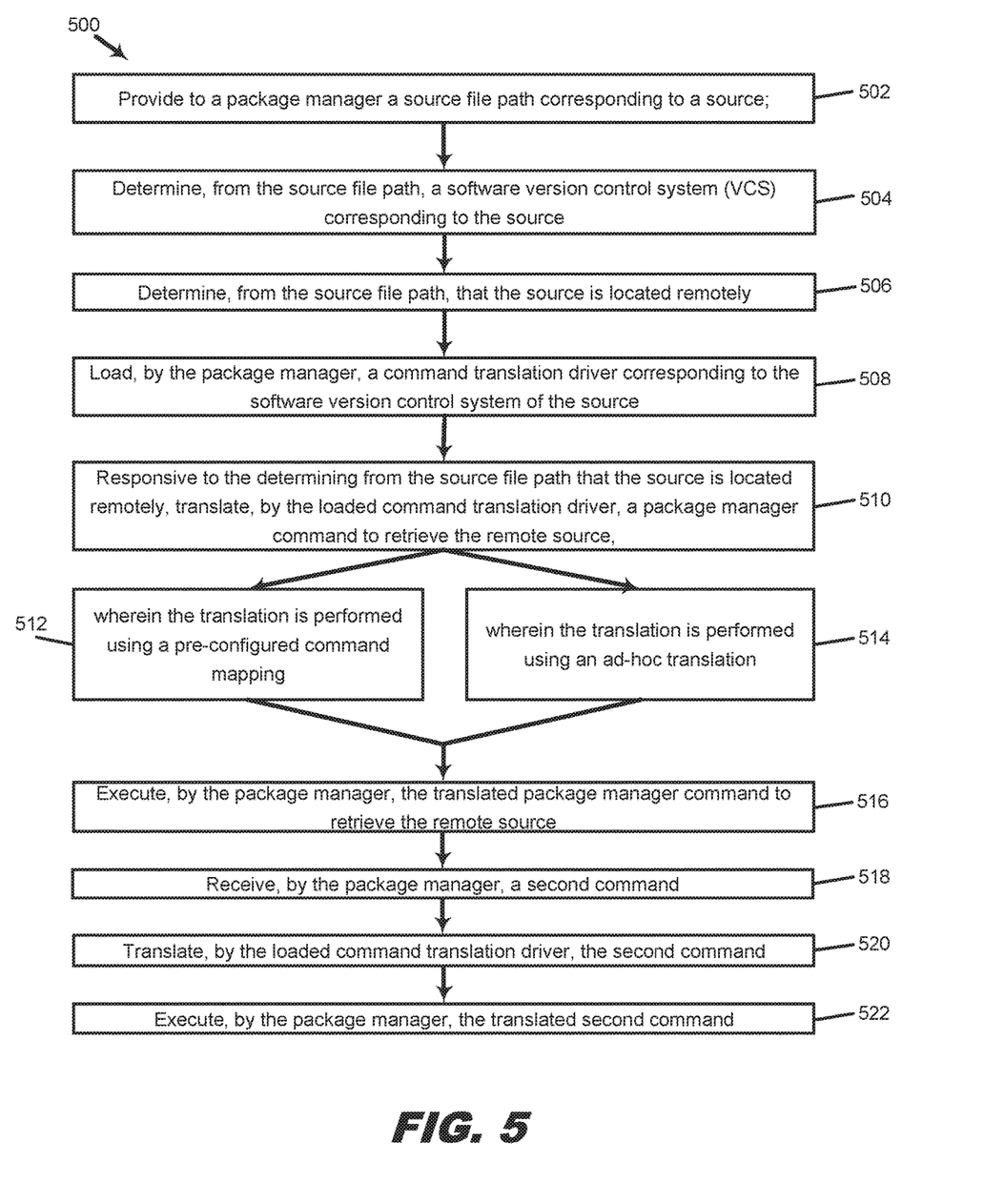
FIG. 5 is a flow diagram illustrating a method for incorporating functionalities of a version control system into a package manager, including a command to retrieve a remote source and a second command, in accordance with various examples of the present disclosure.

FIG. 5 is a flow diagram illustrating a method for incorporating functionalities of a version control system into a package manager, including a command to retrieve a remote source and a second command, in accordance with various examples of the present disclosure. In some examples, the method is performed by executing computer-readable instructions that are stored in a non-transitory memory using one or more processors. The non-transitory memory and processors may be provided by, for example, the hardware described with respect to FIG. 1. The method 500 may be performed by the one or more hardware processors 104 that is described in further detail with respect to FIG. 1. Additional steps may be provided before, during, and after the steps of method 500, and some of the steps described may be replaced, eliminated and/or re-ordered for other examples of the method 500. For example, prior to the steps of method 500, a user may enter a source file path of a remote source file into a build "specification" or build configuration file. As a further example, after the steps of method 500, a package may be built using the provided remote source. Method 500 may also be performed, for example, in combination with the steps of method 200 described with respect to FIG. 2, and/or in combination with other features and functionalities described with respect to FIGS. 1, 3, and 4. In some examples, method 500 may be performed by one or more systems 100 described with respect to FIG. 1, acting in concert or individually.

At action 502, a source file path corresponding to a source is provided to a package manager. The source file path may be local or remote.

At action 504, a software version control system (VCS) corresponding to the source at the source file path is determined. If the corresponding VCS is indeterminable from the source file path, other techniques, such as inspecting the build configuration file, best guess based on historical data, trial-and-error, etc., may be used.

At action 506, based on the source file path, the source is determined to be located remotely. Example remote source file paths include source files located on an internet web site, such as a VCS repository web site. A source file path may also be considered remote if a network interface is required for the system to access the source file.

At action 508, a command translation driver corresponding to the VCS is loaded by the package manager. The command translation driver may be loaded at a prior time, for example, upon initiation of the package manager program. The command translation driver may also be loaded after it is determined that a translation is required to translate a package manager command to a VCS command.

At action 510, a package manager command to retrieve the remote source is received. In response to the determination made at action 506 that the source is located remotely, a translation of the package manager command is performed. The translation translates the command to retrieve the remote source from a package manager command to a corresponding command of the VCS identified at action 504. As described below with respect to actions 512 and 514, a pre-configured command mapping or an ad-hoc translation (or both) may be used to translate the package manager command to retrieve the remote source.

At action 512, the translation of action 510 is performed using a pre-configured command mapping. Such command mapping may, as shown in the examples of FIG. 4, be in the form of a data structure such as a table.

At action 514, the translation of action 510 is performed using an ad-hoc translation. Such ad-hoc translation may be specified by a user, for example, as described with respect to FIG. 4.

At action 516, the translated package manager command to retrieve the remote source is executed. As earlier described, the execution of the translated package manager command may in reality be a transparent execution of the corresponding command of the VCS, i.e., the package manager may enter the corresponding VCS command in a command line interface using the appropriate syntax for that VCS in order to initiate a local file path or repository of that VCS and clone the file structure and contents of the remote source into the initiated local file path or repository.

At action 518, a second command may be received by the package manager. The second command may be any command, including native and non-native commands as described for example with respect to FIG. 3. The second command may be a command to retrieve version control information corresponding to a source. Version control information may include version tracking, a complete long-term change history of every file in the source, branches or merges, markers of traceability for who, what, where, when, how files or lines of code were changed, and any other data which may be retrieved from a version control system.

At action 520, the second command is translated by the loaded command translation driver of action 508. Action 520 may include a step of determining that the second command requires translation, and if so, then performing the translation. The translation may be performed using the pre-configured command mapping of action 512, or the ad-hoc translation of action 514.

At action 522, the translated second command is executed.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
providing, to a package manager, a source file path corresponding to a source;
identifying by the package manager, from an alphanumeric value representing the source file path, a software version control system corresponding to the source;
loading, by the package manager, a command translation driver corresponding to the software version control system of the source;
translating, by the loaded command translation driver, a native package manager command to a corresponding command of the software version control system, wherein the native package manager command is provided via a command line interface; and
executing, by the package manager, the translated package manager command.

2. The method of claim 1, further comprising determining from the source file path that the source is a remote source, and wherein the translating is responsive to the determining from the source file path that the source is a remote source.

3. The method of claim 2, wherein the package manager command includes a command to retrieve the remote source and the corresponding command includes a command to clone or check out the remote source.

4. The method of claim 1, wherein the translating includes using a pre-configured mapping of the command to the corresponding command.

5. The method of claim 1, wherein the translating includes an ad-hoc translation of the command to the corresponding command.

6. The method of claim 1, wherein the package manager command includes a command to retrieve version control information corresponding to the source.

7. The method of claim 1, further comprising building, by the package manager, a package including the source.

8. A non-transitory machine-readable medium having stored thereon machine-readable instructions executable to cause at least one machine to perform operations comprising:
providing, to a package manager, a source file path corresponding to a source;
identifying by the package manager, from an alphanumeric value representing the source file path, a software version control system corresponding to the source;
loading, by the package manager, a command translation driver corresponding to the software version control system of the source;
translating, by the loaded command translation driver, a native package manager command to a corresponding command of the software version control system, wherein the native package manager command is provided via a command line interface; and
executing, by the package manager, the translated package manager command.

9. The non-transitory machine-readable medium of claim 8, further comprising determining from the source file path that the source is a remote source, and wherein the translating is responsive to the determining from the source file path that the source is a remote source.

10. The non-transitory machine-readable medium of claim 9, wherein the package manager command includes a command to retrieve the remote source and the corresponding command includes a command to clone or check out the remote source.

11. The non-transitory machine-readable medium of claim 8, wherein the translating includes using a pre-configured mapping of the command to the corresponding command.

12. The non-transitory machine-readable medium of claim 8, wherein the translating includes an ad-hoc translation of the command to the corresponding command.

13. The non-transitory machine-readable medium of claim 8, wherein the package manager command includes a command to retrieve version control information corresponding to the source.

14. The non-transitory machine-readable medium of claim 8, further comprising building, by the package manager, a package including the source.

15. A system comprising:
   a non-transitory memory; and
   one or more hardware processors coupled to the non-transitory memory to execute instructions from the non-transitory memory to perform operations comprising:
      providing, to a package manager, a source file path corresponding to a source;
      identifying, by the package manager, from an alphanumeric value representing the source file path, a software version control system corresponding to the source;
      loading, by the package manager, a command translation driver corresponding to the software version control system of the source;
      translating, by the loaded command translation driver, a native package manager command to a corresponding command of the software version control system, wherein the native package manager command is provided via a command line interface; and
      executing, by the package manager, the translated package manager command.

16. The system of claim 15, further comprising determining from the source file path that the source is a remote source, and wherein the translating is responsive to the determining from the source file path that the source is a remote source.

17. The system of claim 16, wherein the package manager command includes a command to retrieve the remote source and the corresponding command includes a command to clone or check out the remote source.

18. The system of claim 15, wherein the translating includes using a pre-configured mapping of the command to the corresponding command.

19. The system of claim 15, wherein the translating includes an ad-hoc translation of the command to the corresponding command.

20. The system of claim 15, wherein the package manager command includes a command to retrieve version control information corresponding to the source.

* * * * *